United States Patent [19]

Impastato et al.

[11] Patent Number: 5,201,279
[45] Date of Patent: Apr. 13, 1993

[54] FOOD SUPPLEMENT DISPENSING SYSTEM FOR ANIMALS

[76] Inventors: Frank Impastato; Debra Grass, both of 204A Trefny, Metairie, La. 70003

[21] Appl. No.: 878,814

[22] Filed: May 4, 1992

Related U.S. Application Data

[63] Continuation-in-part of Ser. No. 617,135, Oct. 23, 1990, Pat. No. 5,109,798.

[51] Int. Cl.⁵ .............................................. A01K 5/00
[52] U.S. Cl. .............................................. 119/51.03
[58] Field of Search ................ 119/51.03, 51.01, 53.5, 119/54, 18, 56.1; 401/220, 219, 218

[56] References Cited

U.S. PATENT DOCUMENTS

| | | | |
|---|---|---|---|
| 3,069,718 | 12/1962 | Brady et al. | 401/218 |
| 3,075,230 | 1/1963 | Marchant | 401/218 |
| 3,103,689 | 9/1963 | Borisof | 409/219 X |
| 3,182,347 | 5/1965 | Haines | 401/220 |
| 5,109,798 | 5/1992 | Impastato et al. | 119/51.03 |
| 5,143,022 | 9/1992 | Fore | 119/51.03 |

Primary Examiner—Gene Mancene
Assistant Examiner—Thomas Price
Attorney, Agent, or Firm—Joseph T. Regard

[57] ABSTRACT

A dispenser system for providing food supplements to deer, cattle and the like. The preferred embodiment of the present invention contemplates an animal activated, liquid supplement container dispenser for dispensing a viscous food supplement such as vitamin or mineral enhanced molasses or the like. The dispenser is configured to be compatible with a large variety of containment systems and stands, and to provide effective, controlled dispensing in the wild with little maintenance. The dispenser includes a container with an outlet blocked by a ball valve, which is rotated, for example, by a separate wheel, which in turn is rotated under the action of the animal's tongue. Alternatively, the bottom of the ball valve could be presented for direct rotation by the animal's tongue. As the rotation takes place, the viscous product is dispensed past the ball valve unto the peripheral surfaces of the licking wheel. A first version (FIGS. 1-4) uses a liter bottle container, while second and third versions employ larger reservoirs with multiple dispensers, the second (FIG. 5) being suspended from a tree and the third (FIG. 6) on support legs. The present invention provides an inexpensive, durable system for the dispensing of various nutritional supplements which is compatible with various animal groups and circumstances.

14 Claims, 3 Drawing Sheets

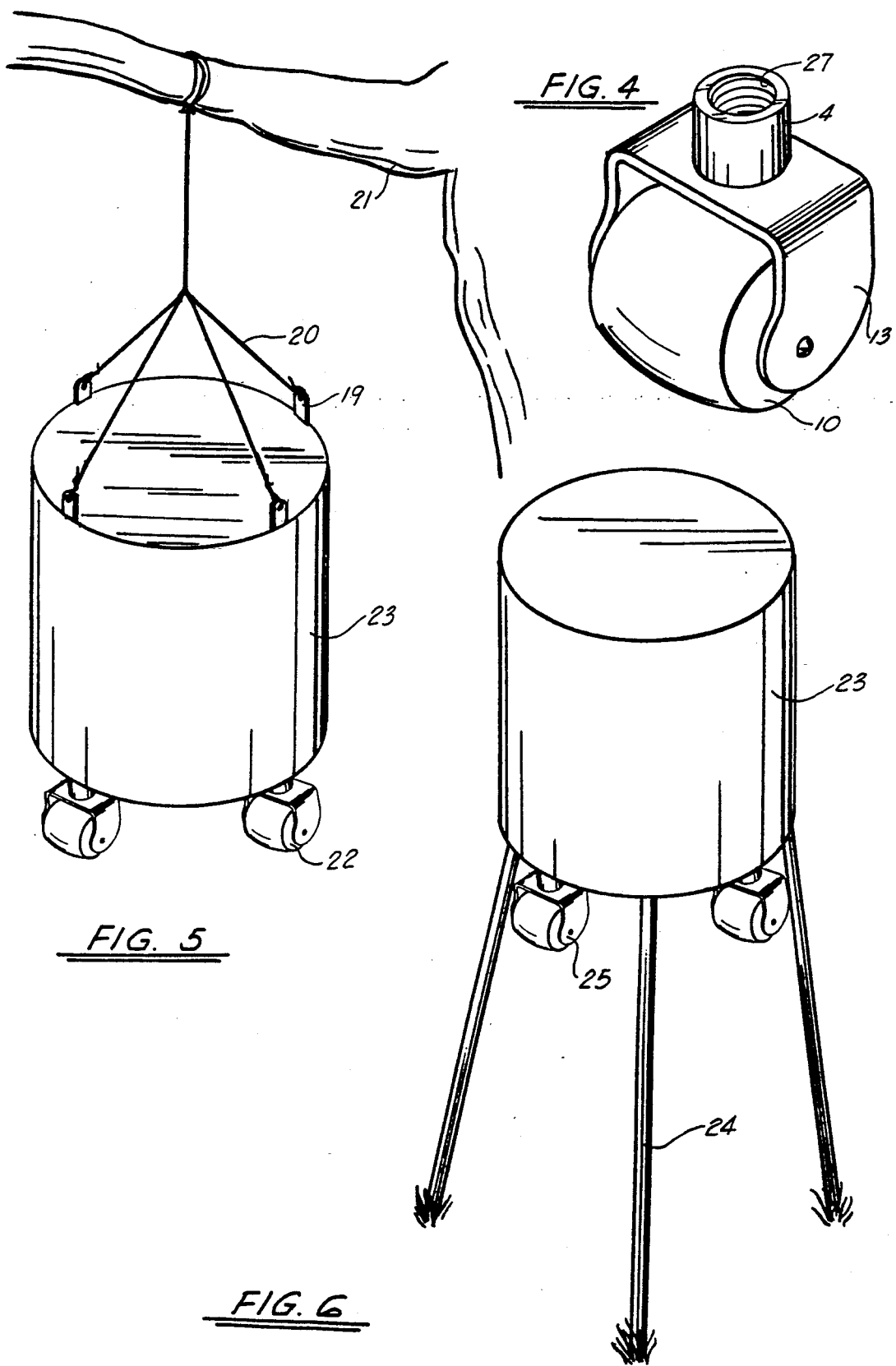

FOOD SUPPLEMENT DISPENSING SYSTEM FOR ANIMALS

REFERENCE to RELATED APPLICATION

The present application is a continuation-in-part of patent application Ser. No. 07/617,135 filed Oct. 23, 1990, being issued as U.S. Pat. No. 5,109,798 on May 5,1992.

BACKGROUND of INVENTION

1. Field of Invention

The present invention relates to animal feeding devices and more particularly to a dispenser system for providing liquid food supplements to deer, cattle and the like.

The preferred embodiment of the present invention contemplates a user activated, liquid supplement container dispenser for dispensing a viscous food supplement such as vitamin or mineral enhanced molasses or the like, with little or no maintenance.

The dispenser is configured to be compatible with a large variety of containment systems and stands, and to provide effective, controlled dispensing in the wild with little maintenance.

The present invention provides an inexpensive, durable system for the dispensing of various nutritional supplements which is compatible with various animal groups and circumstances, providing a self-cleaning system which prevents clogging and build up of residue from the dispensing of heavy and viscous food supplements, which may have the propensity to coagulate.

2. Prior Art and General Background

The prior art has failed to contemplate a portable, maintenance free, effective system for the dispensing of nutritional supplements in the wild or on a farm for various categories of animals, including deer, cattle, and the like.

A list of prior patents which may be of interest is presented below:

| Patent No. | Patentee(s) | Issue Date |
|---|---|---|
| 483,925 | Hurdle | 10/04/1892 |
| 586,148 | Tobias | 07/13/1897 |
| 841,283 | Tjossem | 01/15/1907 |
| 1,080,133 | Zimmer | 12/02/1913 |
| 1,498,220 | Winkler | 06/17/1924 |
| 1,569,990 | Lovering | 01/19/1926 |
| 2,158,093 | Teske | 05/16/1939 |
| 2,158,094 | Teske | 05/16/1939 |
| 2,293,643 | Evans | 08/18/1942 |
| 2,807,235 | Piel | 09/24/1957 |
| 2,972,334 | Braden | 02/21/1961 |
| 3,182,347 | Haines | 05/11/1965 |
| 3,459,159 | Reed | 08/05/1969 |
| 3,515,098 | Thurmond | 06/02/1970 |
| 3,589,338 | Lovitz | 06/29/1971 |
| 3,638,617 | White | 02/01/1972 |
| 3,734,060 | Collison | 05/22/1973 |
| 3,771,496 | Atchley | 11/13/1973 |
| 3,901,191 | Smith | 08/26/1975 |
| 3,946,703 | Wheat | 03/30/1976 |
| 4,386,582 | Adsit | 06/07/1983 |
| 4,667,430 | Ziese, Jr. | 05/26/1987 |

As indicated by a review of the above, the prior issued patents pertinent to the present invention may be divided into six subject areas:

1) salt feeders incorporating cylindrical rotating means for dispensing salt as a supplement to livestock and the like;

2) feed boxes incorporating cylindrical, rotating dispensing apparatus for dispensing dry feed;

3) liquid feeders incorporating spherical or cylindrical rotating feeding members wherein the feeding means comprises a ball or the like partially submerged in a trough of feed;

4) miscellaneous deer feeders utilizing various technologies;

5) miscellaneous other feed devices; and 6) water dispensers.

With regard to (1) above, note U.S. Pat. Nos. 841,283,586,148, and 483,925 issued 1907, 1897, and 1892, respectively, teaching similar designs for "salt licks" utilizing cylindrical dispensing means associated therewith.

With regard to (2) above, note U.S. Pat. No. 1,569,990 directed to a granular feed box dispenser incorporating cylindrical dispensing means somewhat similar to that taught in the above salt dispensers.

With regard to the liquid feeder class, see U.S. Pat. Nos. 3,946,703, 3,901,191, 4,386,582, 4,734,060, 3,459,159, 2,293,643, 2,158,094 and 2,158,093 issued from 1937 to present. Virtually all of the above cited prior art teach wheels, balls and the like partially submerged in a reservoir of liquid feed below the wheel or ball, therein teaching a different apparatus than that contemplated in the present invention.

Relative to the miscellaneous deer feeding class, see U.S. Pat. No. 4,667,430 directed to a capillary operating scent dispensing apparatus for luring bucks and the like to an area for hunting purposes.

U.S. Pat. No. 3,638,617 discloses a "deer and wild turkey feeder," wherein the action of the animal eating an ear of corn on the apparatus causes it to dispense an amount of feed.

U.S. Pat. No. 3,515,098 issued 1970 discloses a "wildlife feeder" wherein the animal's action of eating on a piece of brush or the like dispenses feed, as does U.S. Pat. No. 2,972,334, save for a slightly different apparatus design.

With regard to miscellaneous feeders, these encompass U.S. Pat. Nos. 3,840,040, 3,589,338, 2,807,235, 1,492,220 and 1,080,133, contemplating various designs for poultry feeders, capillary feeders, tube-type water apparatus, etc.

Finally, class (6) encompasses only U.S. Pat. No. 3,771,496 teaching a "demand delivery pump for small animals".

As may be determined by a review of the above, the prior art has failed to contemplate a liquid feeder device as contemplated by the present invention. The prior art liquid feeders, especially liquid supplement dispensers, are shown to be rather bulky, expensive, permanent devices which would be impractical to use in the field. Further, the prior art liquid supplement dispensers appear to be less resistant to rain, dust, and other climate variables when compared to the present device.

U.S. Pat. No. 3,182,347 issued 1965 to Haines teaches a "roller applicator for marking animals" and does not fall into any of the categories set forth above, but is denoted as one may consider that there are some generalized structural similarities, which are nonetheless distinguishable in form and function from the present invention.

The apparatus of Haines is configured for marking animals, and would not be suitable for the method of the present invention, just as the present invention would not be suitable for the method of Haines. Further, structurally, the present invention is fully distinguishable in elements and operation.

For example, the ball (21) is configured in position a via leaf spring (22) against wall (17) portions (20) to seal dye or ink (14) in portion (13) of the cane; ball (21) is configured to unseal portion (20) when pressure is applied via roller (33), allowing the flow of ink to mark the animal to which the roller (33) is pressed.

While such an arrangement as taught in Haines might be useful for dispensing a fluid ink, dye, or the like, it is submitted that the configuration would be unsuitable for dispensing a viscous substance such as molasses or related liquid feed supplements, which require a greater "dosage" of dispensed matter per revolution of the dispensing roller.

Haines, which was the primary reference asserted in the parent application, contemplates a system wherein relatively non-viscous ink or the like will easily flow freely through the relatively small portion (20) and onto roller in sufficient quantities for marking an animal, but it is submitted that if one were to place the liquid feed of the present invention into the device of Haines, the feed "dispensed", if any, would be entirely insufficient to sustain a single animal, and especially would not sustain a herd.

Further, the design of Haines, including the relatively tiny dispenser aperture portion (20), the leaf spring (22) in ink (14) containing portion (13), and wall portion (17) removed from the operation of the relatively small ball (21) would doubtless clog over a short period of use if the viscous, coagulating food supplement as taught in the present invention were placed therein for dispensing.

In summary, the prior art has failed to contemplate a device which could be used in conjunction with the dispensing of thick, viscous food supplements which may have a propensity to coagulate, and which may be self cleaning to prevent clogging of same.

Further, the prior art has failed to contemplate a device which may be easily reconfigured to have various volume containers and number of dispensers, as is contemplated by the present device.

3. General, Summary Discussion of the Invention

The present invention overcomes these prior art problems by providing a system which is highly reliable, relatively economical and very cost effective, teaching a food supplement dispenser which is adaptable to a variety of situations and elements, with superior overall performance over the prior art.

The present invention is configured to be effective in the controlled dispensing of viscous food supplements such as enriched molasses or the like to wild or domesticated animals.

The preferred embodiment of the present invention teaches a dispensing device comprising a rotating dispensing surface which is in communication with a gravity ball valve, configured to control the flow of the fluid.

The dispensing surface, in addition to rotating about an axis, also is configured to travel in a linear direction toward the gravity ball valve, pressing the ball valve out of its seat and thereby opening the valve a small amount in order to allow the fluid supplement to be drawn by gravity through the tolerance between the gravity ball valve, the housing or conduit (4), and the valve opening onto the dispensing wheel, where it contacts the animal's tongue. It is the animal's "licking action" which rotates and moves the dispenser wheel for dispensing the supplement.

Further, the present invention is designed such that the longitudinal travel of the ball valved up and down conduit (4) during the feeding process acts to prevent the accumulation of residual feed or coagulation of feed, providing a self cleaning system for the dispensing of same.

The present invention may be used in a variety of configurations, including portable, single feeder systems utilizing, for example, a one liter soft drink bottle as the reservoir and affixed to a tree, to a multi-feeder system affixed to a 55 gallon drum, with its own stand.

The present system is configured primarily for providing food supplement dispensing means for wild or domesticated deer, in order to help the animal's development of its antlers, growth, and general health. It is believed that such a food supplement system is unique in its apparatus structure and system which is configured primarily for effective use in the wild.

While it is an object of the present invention to provide a food supplement dispenser for wild or domestic deer, the present system may be utilized for a variety of animals.

It is thus an object of the present invention to provide food supplement dispenser system which may be used for a variety of animals, domestic or wild.

It is another object of the present invention to provide a food supplement dispenser which is adaptable to different size and configuration reservoirs or storage containers and stands.

It is another object of the present invention to provide a food supplement dispenser which provides an effective, controlled means of dispensing a viscous liquid food supplement in a consistent manner.

It is another object of the present invention to provide a food supplement dispenser which may be adjusted for use with various viscosity supplements.

It is another object of the present invention to provide a food supplement dispenser system specifically designed to provide better heath and rack characteristics to the deer population in a particular area.

It is another object of the present invention to provide a food supplement dispenser which is inexpensive to manufacture and easily replaceable.

It is another object of the present invention to provide a food supplement dispenser for dispensing relatively heavy, viscous food supplements in the like which may have a tendency to coagulate and clog, the dispenser being configured to be self cleaning, and non-clogging.

Lastly, it is an object of the present invention to provide a food supplement dispenser which may be effectively used in a variety of elements without lessening performance.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 4 is an isometric view of the animal food supplement dispenser system of FIG. 1.

FIG. 5 is a side, perspective view of an alternative embodiment of the present invention, illustrating the animal food dispenser system of the present invention configured as a multi-dispenser system with a large volume feed reservoir, hung from a tree.

FIG. 6 is a side, perspective view of the multi-dispenser feeder of FIG. 5, but illustrating an alternative support means, namely, a free standing pole system, which allows the multi-dispenser system to be mounted on the ground.

DETAILED DESCRIPTION OF THE PREFERRED, EXEMPLARY EMBODIMENTS

Figure 1:
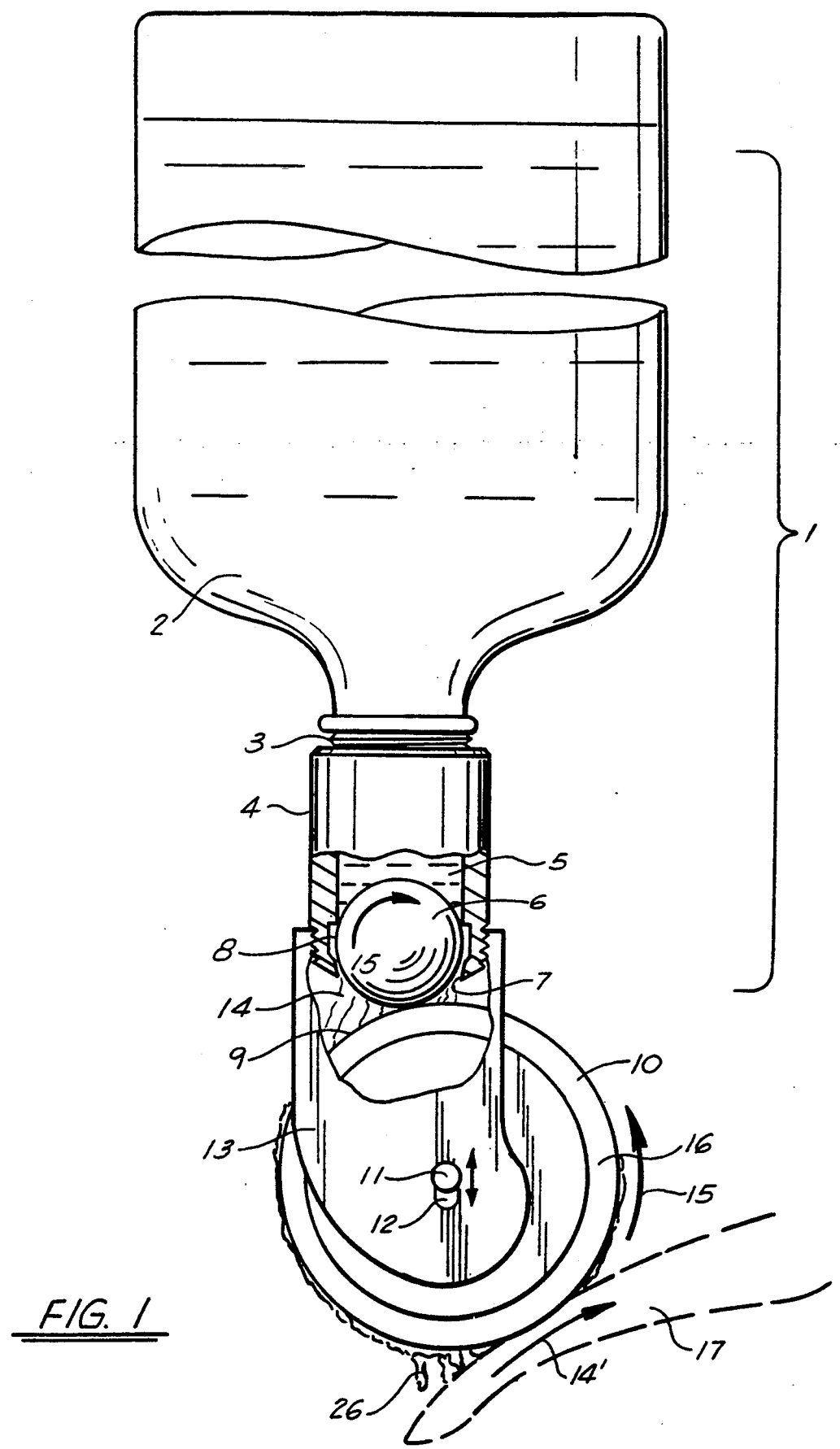
FIG. 1 is a side, partially cutaway, partially cross-sectional view of the preferred embodiment of the animal food supplement dispenser system (with an attached, standard container) of the present invention, illustrating with curved directional arrows the motion and positioning of an exemplary animal's tongue in phantom line, whose movement causes rotation of the dispensing elements, causing food supplement to be dispensed from the container to the animal's tongue.

As can be seen in FIGS. 1-4, the food supplement dispenser 1 of the preferred, exemplary embodiment of the present invention, comprises a container 2 in the form of, for example, a one liter soft drink bottle which is threadingly engaged 3 to a conduit 4, which is configured to allow the supplement 5 to transfer from the container 2 to the dispenser wheel 10.

The supplement 5 is prevented from leaking from the threaded conduit 4 by a dispenser ball bearing 6, which is situated in an open area 8 of the conduit 4, resting on tapered seal area 7, which is configured to seal upon contact with the bearing 6.

The dispensing wheel 10 is attached on an axle 11, slidingly engaged to bracket 13 having vertical slot 12, which is in turn configured to allow wheel 10 to move in vertical fashion when pressure is applied thereto. This vertical movement presses the contact surface of the wheel against the dispenser bearing 6 in an upward fashion, opening the seal between the bearing surface and tapered area 7, and allowing the migration of the supplement 14 to the surface of wheel 9.

Figure 3:
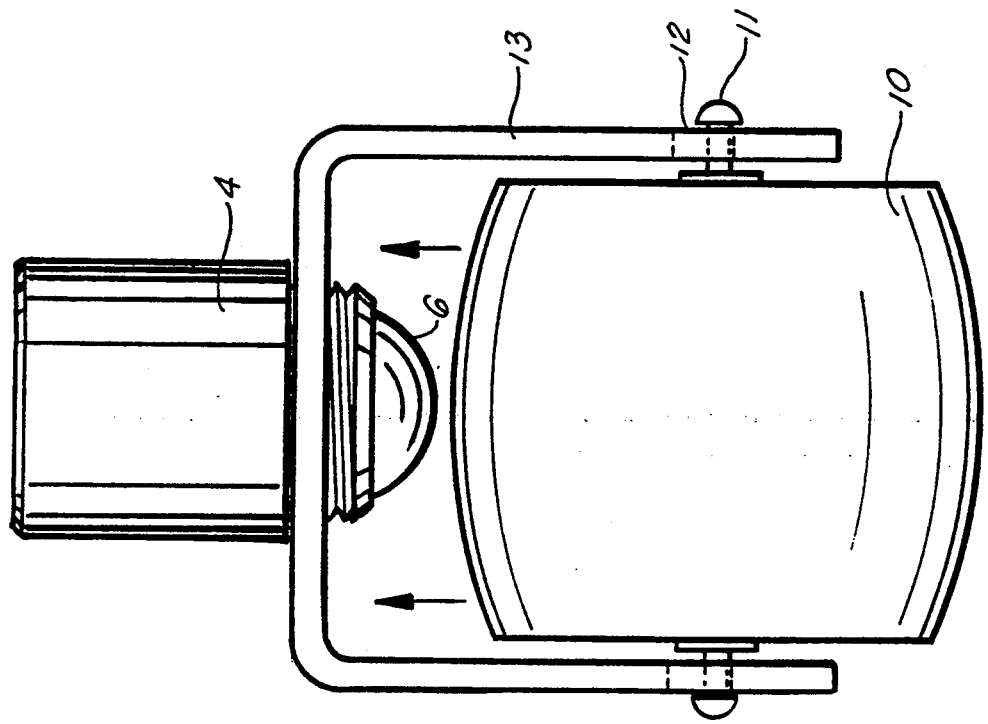
FIG. 3 is an end view of the animal food supplement dispenser system of FIG. 1, showing the allowed vertical movement of the wheel mounting by direction arrows.
Figure 2:
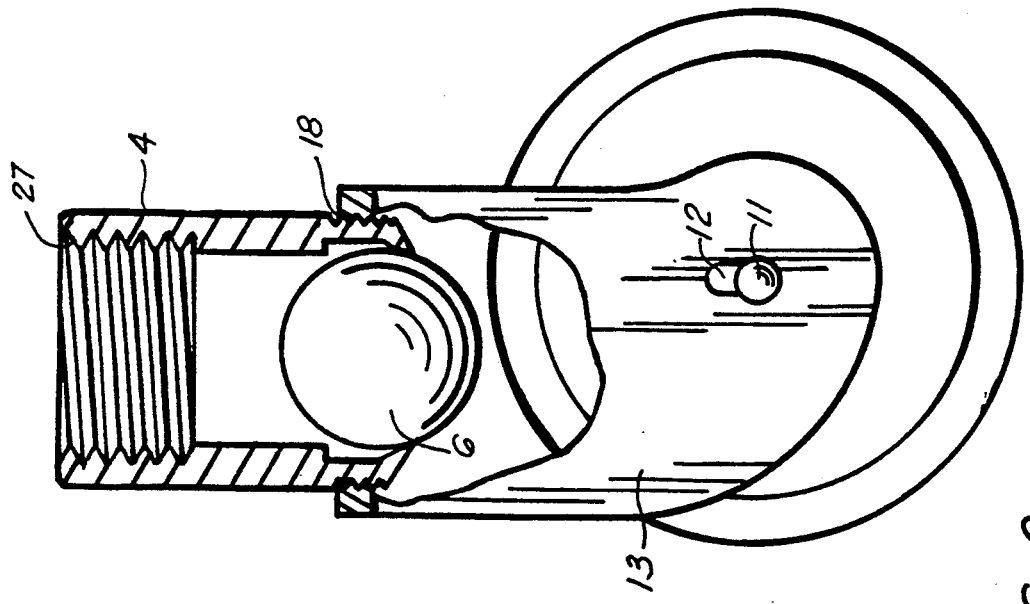
FIG. 2 is a side view of the animal food supplement dispenser system of FIG. 1.

As further shown in FIGS. 2, 3 and 4, the present invention's engagement portion 4 further includes upper 27 and lower 18 threaded portions for engaging the dispenser and wheel carriage or bracket 13, respectively. FIGS. 2 and 3 further illustrate the vertical travel of wheel 10 via slot 12.

In use, the animal licks the wheel with its tongue 17, causing vertical, lateral and rotatable movement of the wheel, lifting the bearing 6 from its contact with tapered seal 7, allowing the supplement to pass through open area 8 and contact the dispensing surface of the wheel 9. The animal's licking action 17' rotates the wheel, allowing the dispensed supplement 26 to reach the tongue 17. Further, the rotating motion 15 of the wheel 10 transfers to ball bearing 6, which in turn is rotated 15', assisting in the dispensing of the usually viscous supplement from the container to the wheel.

Note further, as shown in FIG. 1, that when the wheel 10 is extended to its most vertical position, it pushes the ball 6 upward to communicate with the upper seal area 28, and, with the ball's 6 rotating motion 15, upper seal area 28 is cleared of any residual, coagulated food supplement or the like, preventing or at least retarding clogging.

Further, with the upper seal area 28 engaged during the full vertical position of wheel 10 during the licking cycle, the animal has dispensed just the right amount of liquid feed, substantially as contained in open area 8. Thus, the size of the open area 8 can be varied to allow for different dosages of supplement per licking cycle. In the present invention, the volume of supplement contained in the exemplary sized open area 8 is on the order of, for example, one tablespoon. Thus, approximately one (1) tablespoon of supplement is dispensed on wheel 10, every licking cycle.

After the licking cycle is completed, the wheel 10 returns to its fully lowered position, allowing the ball 6 to lower, communicating with the lower, tapered seal 7, and unsealing the upper seal area 28, allowing the flow of supplement into the open area 8, for dispensing in the next licking cycle.

Note that, while the upper seal area and open area 8 are desirable features of the present invention, they are not critical to the operation of the present invention, and an alternative embodiment may be utilized without the controlled dispensing open area and upper seal arrangement.

Additionally, although the use of the wheel 10 as an intermediary between the ball valve and the animal's tongue is preferred, an alternative embodiment could eliminate the wheel and allow the bottom of the ball valve 6 to be directly contacted and driven by the animal's tongue. Also, although it is highly desirable and advantageous to have the ball valve 6 seated in a cylindrical, extended chamber to actually meter the amount of fluid dispensed, it would also be possible to merely seat the ball valve in, for example, a spherical opening or chamber. These alternatives, although within the scope of the broader aspects of the invention, are not directly part of the inventors' inventive contribution.

Furthermore, while the exemplary embodiment of the present invention teaches upper threaded area 27 of an exemplary diameter to threadingly engage, for example, a one (1) liter soft drink bottle as an inexpensive, effective container for the supplement, other alternative container/dispenser arrangements are also readily usable.

For example, FIGS. 5 and 6 illustrate a tree hung unit with multiple dispenser units 22 and a self-standing unit with multiple dispenser units 25, respectively. The tree hung unit in FIG. 5 is configured to contain via container 23 substantially more than one liter of feed, and is suspended from, for example, the branch 21 of a tree via cable 20 engaging eyelets 19.

The free standing multi-feeder illustrated in FIG. 6 is similar in operation and configuration to the tree hanging unit of FIG. 5, except it includes means to engage a plurality of leg supports 24.

The alternative embodiments of the present invention can include a variety of container sizes from, for example, one to fifty-five (1-55) gallons, and up, depending upon the application.

The embodiments described herein in detail for exemplary purposes are of course subject to many different variations in structure, design, application and methodology. Because many varying and different embodiments may be made within the scope of the inventive concepts herein taught, and because many modifications may be made in the embodiments herein detailed in accordance with the descriptive requirements of the law, it is to be understood that the details herein are to be interpreted as illustrative and not in a limiting sense.

What is claimed is:

1. A animal feeder for dispensing fluid food supplements, comprising:
   a container; and
   a dispenser, including
      an engagement portion having a longitudinal passage therethrough, said longitudinal passage having circular, inner, side walls and upper and lower ends, said longitudinal passage further having formed therein upper and lower seal areas, and an open, dispensing chamber juxtaposed to said seal area, said upper end of said engagement portion being engaged to said container, said dispenser further including-
      a dispenser bearing substantially situated in said dispensing chamber of said engagement portion;
      lower engagement means situated at said lower end of said engagement portion;
      a dispenser wheel having an axle and contact surface, said dispenser wheel in communication with said dispenser bearing; and
      bracket means for supporting said axle of said dispenser wheel, said bracket means being engaged to said lower engagement means of said engagement portion, said bracket means communicating with said dispenser wheel, said bracket means further configured so as to allow limited movement of said dispenser wheel in a longitudinal fashion via said axle, from a first, lower position, to a second, upper position, wherein said dispenser bearing communicates with said upper seal area in a sliding or rolling fashion when said dispenser wheel is in its second, upper position, and said dispenser bearing communicates with said lower seal area in a somewhat fluid impermeable fashion when said wheel is in its first, lower position.

2. The animal feeder of claim 1, wherein said upper end of said engagement means engages with said container via a threaded engagement.

3. The animal feeder of claim 2, wherein said bracket means further comprises longitudinal axle support means for supporting said axle of said wheel said longitudinal axle support means being configured to allow said axle and said wheel to rotate about said axle support means when longitudinal force is applied thereto.

4. The animal feeder of claim 3, wherein said dispenser bearing is configured to move in longitudinal fashion out of said tapered seat and rotate when longitudinal, rotating force is applied thereto via said contact surface of said wheel.

5. The animal feeder of claim 4, wherein said animal feeder comprises a plurality of dispensers affixed to said container.

6. The animal feeder of claim 4, wherein said container further comprises hanging means for hanging said container from an overhead support.

7. The animal feeder of claim 1, wherein said container further comprises a plurality of upwardly extending support legs.

8. The animal feeder of claim 1, wherein said container comprises a one liter bottle.

9. The animal feeder of claim 1, wherein said food supplement comprises vitamin and mineral enriched molasses.

10. The animal feeder of claim 1, wherein the dispensing chamber of said engagement member is configured for providing an estimated dosage of said food supplement to said dispenser wheel when said dispenser bearing is in its second, upper position.

11. A method of supply food supplements to animals, comprising the following steps:
    (a) providing a food supplement device, having
        a container having a food supplement therein;
        a dispenser, including
            an engagement portion having a longitudinal passage therethrough, said longitudinal passage having circular, inner, side walls and upper and lower ends, said longitudinal passage further having formed therein upper and lower seal areas, and an open, dispensing chamber juxtaposed to said seal areas, said upper end of said engagement portion engaged to said container, said dispenser further including-
            a dispenser bearing substantially situated in said dispensing chamber of said engagement portion;
            lower engagement means situated at said lower end of said engagement portion;
            a dispenser wheel having an axle and contact surface, said dispenser wheel in communication with said dispenser bearing; and
            bracket means for supporting said axle of said dispenser wheel, said bracket means being engaged to said lower engagement means of said engagement portion, said bracket means communicating with said dispenser wheel, said bracket means further configured to allow limited movement of said dispenser wheel in a longitudinal fashion via said axle, from a first, lower position, to a second, upper position, wherein said dispenser bearing communicates with said upper seal area in a sliding or rolling fashion when said dispenser wheel is in its second, upper position, and said dispenser bearing communicates with said lower seal area in a somewhat fluid impermeable fashion when said wheel is in its first, lower position;
    (b) dispensing said food supplement by applying upward longitudinal and rotating force to said dispenser wheel, said dispensing further comprising the following steps:
        i. rotating and migrating said dispenser wheel in an upward, longitudinal fashion;
        ii. lifting and rotating said dispenser bearing in an upward, longitudinal fashion, allowing said food supplement to migrate to said dispenser surface of said dispenser wheel; and
        iii. licking said food supplement from said dispenser surface of said dispenser wheel.

12. The method of dispensing a food supplement of claim 11, wherein in step "a" there is included the further step of:
    filling said container with a food supplement.

13. A method of supply food supplements to animals, comprising the following steps:
    (a) providing a food supplement device, having a container having a food supplement therein; and a dispenser, including an engagement portion having a longitudinal passage therethrough, said longitudinal passage having circular, inner, side walls and upper and lower ends, said longitudinal passage further having formed therein upper and lower seal areas, and open dispensing chamber juxtaposed to said areas, said upper end of said engagement portion being engaged to said container, said dispenser further including, a dispenser bearing substantially situated in said dispensing chamber of said engagement portion, said dispenser bearing being configured to communicate with said circular inner side walls in a sliding or rolling fashion; and (b) dispensing said food supplement by applying upward longitudinal and rotating force to said dispenser bearing, said dispensing further comprising the following steps:

i. rotating and migrating said dispenser bearing in an upward, longitudinal fashion; as a result of licking, ii. lifting and rotating said dispenser bearing in an upward, longitudinal fashion, licking said dispenser bearing which applies an upward longitudinal force, such that said bearing closes said upper seal area while allowing said food supplement in said longitudinal passage to migrate through said lower seal area onto said dispenser bearing, iii. and then allowing said dispenser bearing to engage said lower seal area in a closing fashion.

14. The method of dispensing a food supplement of claim 13, wherein in step "a" there is further included the step of:

filling said container with a food supplement.

* * * * *